US007559495B2

(12) United States Patent
Coble

(10) Patent No.: US 7,559,495 B2

(45) Date of Patent: Jul. 14, 2009

(54) SOFT START, HIGH INERTIA FLYWHEEL FOR TUB GRINDERS

(75) Inventor: Leonard Coble, 903 West St., Hedrick, IA (US) 52563

(73) Assignee: Leonard Coble, Hedrick, IA (US)

( * ) Notice: Subject to any disclaimer, the term of this patent is extended or adjusted under 35 U.S.C. 154(b) by 372 days.

(21) Appl. No.: 11/318,748

(22) Filed: Dec. 27, 2005

(65) Prior Publication Data

US 2006/0163398 A1 Jul. 27, 2006

Related U.S. Application Data

(60) Provisional application No. 60/639,385, filed on Dec. 27, 2004.

(51) Int. Cl.

| | |
|---|---|
| ***A01D 34/00*** | (2006.01) |
| ***B02B 5/02*** | (2006.01) |
| ***B02C 9/04*** | (2006.01) |
| ***B02C 19/00*** | (2006.01) |
| ***B03B 7/00*** | (2006.01) |

(52) U.S. Cl. ............................ 241/101.761; 241/186.4

(58) Field of Classification Search ............. 241/186.4, 241/101.761

See application file for complete search history.

(56) References Cited

U.S. PATENT DOCUMENTS

| | | | | |
|---|---|---|---|---|
| 4,768,723 | A * | 9/1988 | Fritz | 241/268 |
| 4,773,600 | A * | 9/1988 | Metski | 241/101.76 |
| 4,834,302 | A * | 5/1989 | Baker | 241/92 |
| 4,874,024 | A * | 10/1989 | Arasmith | 144/174 |
| 4,923,130 | A * | 5/1990 | Campbell | 241/236 |
| 5,878,968 | A * | 3/1999 | Anderson et al. | 241/186.4 |
| 5,950,942 | A * | 9/1999 | Brand et al. | 241/101.761 |
| 6,412,715 | B1 * | 7/2002 | Brand et al. | 241/30 |

FOREIGN PATENT DOCUMENTS

GB 2030287 A * 4/1980

* cited by examiner

*Primary Examiner*—Bena Miller

(74) *Attorney, Agent, or Firm*—Kent A. Herink; Emily E. Harris

(57) ABSTRACT

The invention is a high inertia flywheel for a tub grinder to stabilize the rotational speed of a hammermill of the tub grinder and to act to prevent jamming of the tub grinder. A high inertia flywheel attached to either the input or output shaft of the hammermill and outside the confines of the tub. A slip clutch or fluid coupling interconnects the flywheel to the hammermill. A motor spins the flywheel to a desired speed before the clutch is engages or disengaged. A control is used for adjusting the connection between the motor means and the flywheel.

5 Claims, 3 Drawing Sheets

SOFT START, HIGH INERTIA FLYWHEEL FOR TUB GRINDERS

This application claims the benefit of U.S. Provisional Application No. 60/639,385, filed Dec. 27, 2004.

BACKGROUND OF THE INVENTION

The invention relates generally to flywheels and, more specifically, to a soft start, high inertia flywheel for use with tub grinders.

Flywheels have been used for many years dating back to the steam engine and single cylinder gas engines to produce inertia to carry the load between piston firings. Many mechanical systems use flywheels to stabilize the rotation of the engine and the driven equipment.

A tub grinder has a tub-shaped enclosure including a circular floor, generally cylindrical sidewalls and an open top. An example of a tub grinder is described in U.S. Pat. No. 5,950,942. Material to be comminuted by the tub grinder is added to the tub through the open top. A hammermill rotates at a high speed along a typically horizontal axis below the floor of the tub. The outer periphery of the hammermill extends above the floor of the tub to come into contact with the material to be ground. Most tub grinders are mounted on vehicles for transport to sites of material to be ground.

Tub grinders are used to grind a wide variety of materials including stumps and logs. Gravity is essentially used to feed the material to the hammermill that makes the flow and quantity of material entering the hammermill very inconsistent and uncontrolled. As a result, the rpms of the drive engine of the hammermill frequently go up and down, sometimes even jamming the hammer milt and stalling the engine. A large flywheel would stabilize the engine rpm's and help prevent jams when the hammermill attempts to grind too much material.

If a flywheel is to be attached to the hammer mill, it must be located outside the tub diameter. Preferably, the flywheel is located just outside the tub diameter but still mounted directly to the hammermill so as to most effectively transmit its inertia load into the grinding process.

There are five problems with flywheels on hammermillson mobile equipment; weight, bearing support, torque limiting, and startup and slowdown control.

SUMMARY OF THE INVENTION

The invention consists of a high inertia flywheel for a tub grinder to stabilize the rotational speed of an engine-driven hammermill of the tub grinder and to act to prevent jamming of the tub grinder. The high inertia flywheel is attached to either the input or output shaft of the hammermill and is located outside the confines of the tub. A slip clutch or fluid coupling interconnects the flywheel to the hammer mill. A control is provided from adjusting the connection between the engine and the flywheel.

The alternatives to the present invention are to add more horsepower to the engine of the tub grinder, which costs money, or to add weight or inertia to the existing engine flywheel which is detrimental to engine bearings, or finally to simply add weight to the hammermill but that would add too much weight for the same inertia. The prior art has failed to address these issues in that most tub grinders have increased the hammermill diameters to increase the grinding production. This has the negative effect of also adding weight. Large torque limiters through the driveline force the driveline to be oversized.

An object of the invention is to provide a lightweight, soft start, high inertia flywheel for portable tub grinders.

Another object of the invention is to provide a flywheel for a tub grinder that can be mounted either to the input or output end of the drive shaft of the hammermill of the tub grinder.

These and other objects of the invention will be made apparent to those skilled in the art upon a review of this specification, the associated drawings and the appended claims.

DETAILED DESCRIPTION OF A PREFERRED EMBODIMENT

Figure 1:
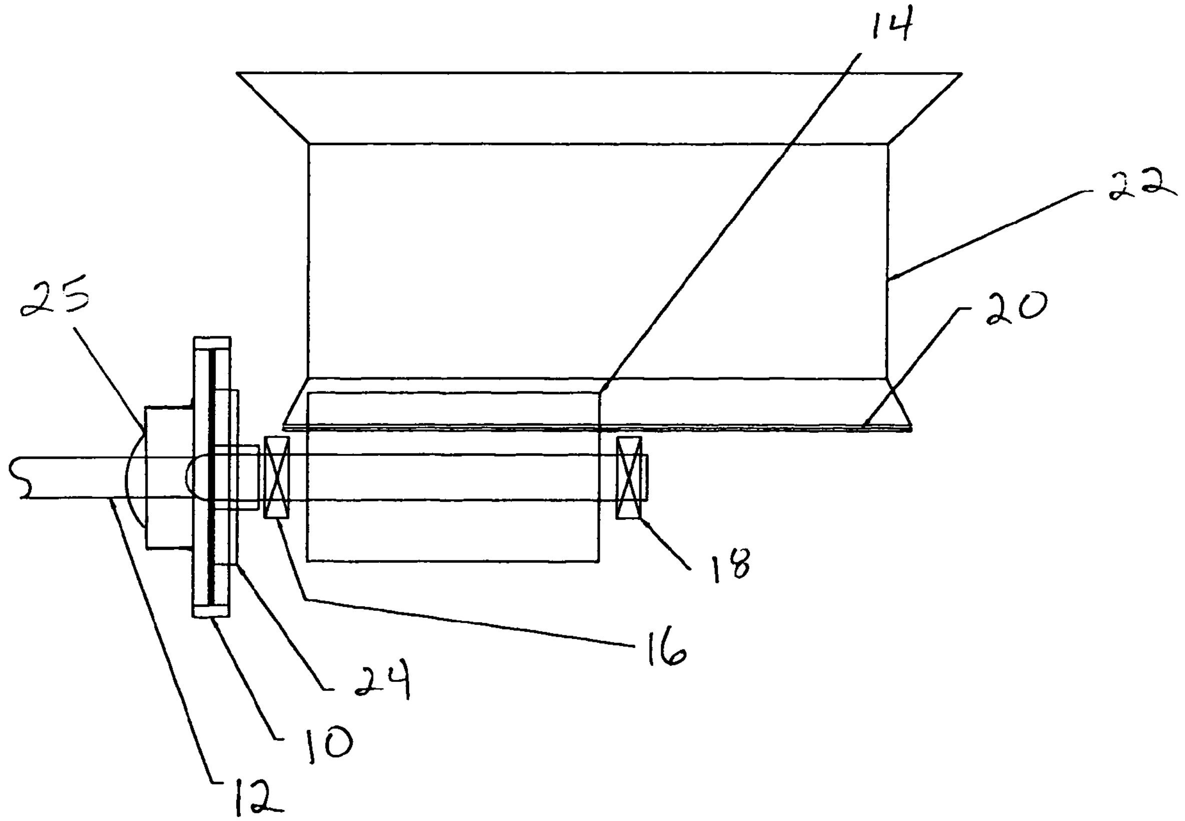
FIG. 1 is a side elevational view of a flywheel attached to the input shaft or a hammermill of a tub grinder.

Referring to the drawings, there is illustrated in FIG. 1, generally at 10, a flywheel of a preferred embodiment of the present invention, which is part of a mobile tub grinder. The flywheel 10 is mounted on the input end of a drive shaft 12 of a hammermill 14. The drive shaft 12 is driven by an engine (not shown) and is mounted in a pair of bearings, input end bearings 16 and output end bearings 18. Rotation of the drive shaft 12 rotates the hammermill 14 between the pair of bearings 16 and 18 and below the floor 20 of the tub 22 of the tub grinder. As best illustrated in FIG. 2, the outer periphery of the hammermill 14 extends above the floor 20 of the tub 22 to come into contact with material inside the tub 22 that is to be ground or comminuted by the tub grinder.

The flywheel 10 is preferably mounted to the input side of the hammermill 14, but may optionally be mounted on the output side if the hammermill 14 was situated on the opposite side of the tub 22. By mounting the flywheel 10 directly to the drive shaft 12, advantage is taken of the existing bearings 16 and 18 and thus saves the cost and weight of adding additional mounting apparatus. The flywheel 10 is preferably as large in diameter as possible to fit within the confines of the tub grinder so as to minimize the weight and yet maximize the inertia of the flywheel 10. As illustrated in FIG. 1, this typically dictates that the flywheel 10 be mounted such that it is outside the radial extent of the tub 22 and has an outer periphery that rotates above the tub floor 20.

Figure 2:
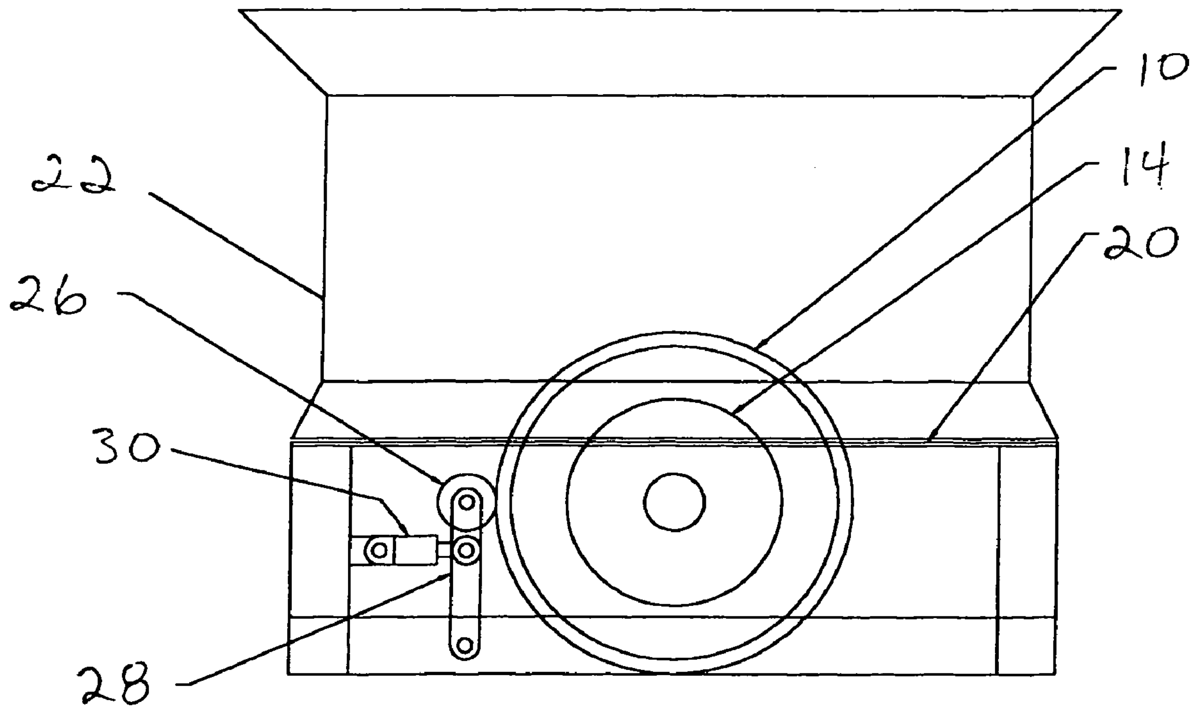
FIG. 2 is a front elevational view corresponding to FIG. 1.
Figure 3:
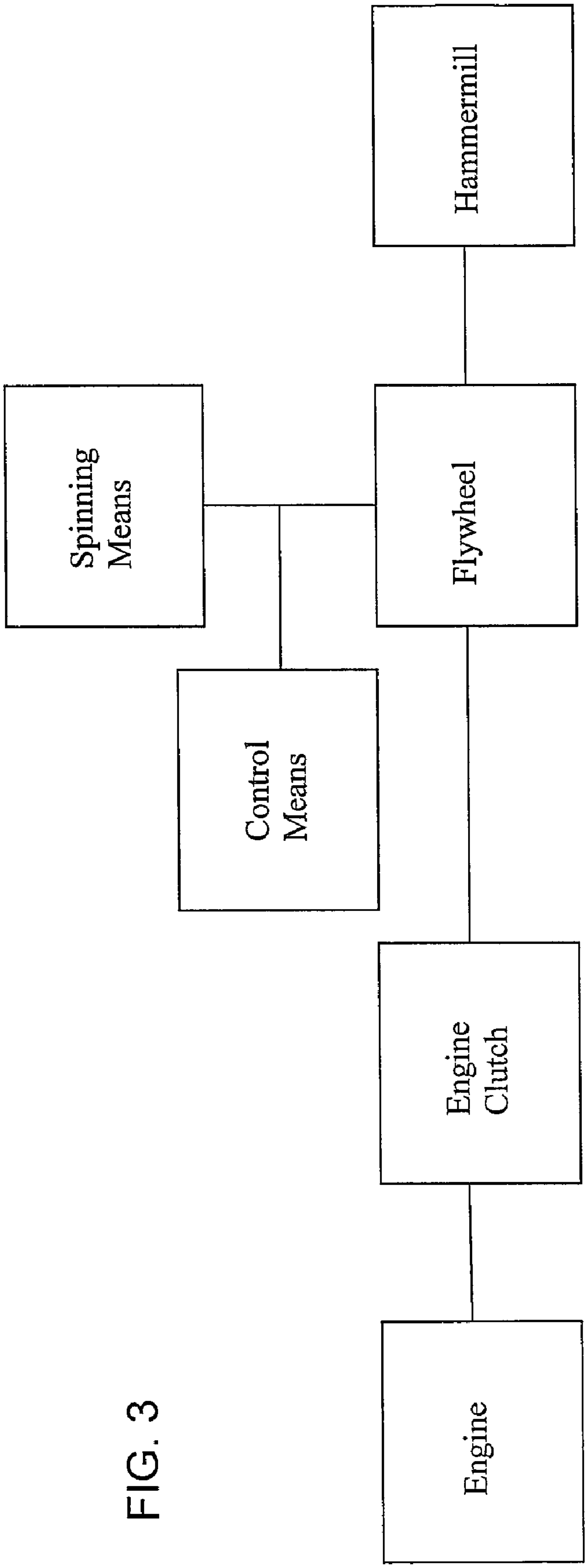
FIG. 3 is a schematic diagram of components of the invention.

In the preferred embodiment, a wheel 26 powered by a hydraulic motor is mounted on the free end of a pivot arm 28 (FIG. 2). The wheel 26 is brought into and out of driving contact engagement with the outer periphery of the flywheel 10 by a linear actuator 30, such as a hydraulic cylinder. Accordingly, the powered wheel 26 is used to spin the hammermill 14 up to speed before the engine clutch is engaged or disengaged. The linear actuator 30 is used to control the pressure at which the motor wheel 26 contacts with the flywheel 10. The powered drive wheel 26 and linear actuator 30 thereby provide a slow start function whereby the flywheel 10 is brought up to speed before the engine clutch is engaged. Without a slow start capability, the engine clutch is brings into driving engagement the drive shaft of the engine that is turning at a high rate of speed with the heavy, high inertia hammermill 14 initially at rest, resulting in an enormous amount of stress being place on the engine clutch. This stress can kill the engine or even destroy the engine clutch.

In an alternative embodiment, a mechanical slip clutch 24 is provided between the flywheel 10 and the hammermill 14 to control the amount of energy dumped into the hammermill 14 (FIG. 1). The soft start feature may also be accomplished by use of a fluid coupling 25 located on the input side of the flywheel 10 and will act to prevent ultimate failure if a jam of the hammermill 14 occurred (FIG. 1).

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

I claim:

1. Apparatus for stabilizing the rotational speed of a tub grinder and to act to prevent jamming of the tub grinder, comprising:

(a) a tub grinder; a drive shaft having an input end that is drivingly connected to and rotated by an engine of the tub grinder and an output end;

(b) a hammermill mounted on the drive shaft between the input end and the output end for rotation by the engine and positioned inside the radial confines of the tub;

(c) a high inertia flywheel attached to either the input or output end of the drive shaft of the hammermill and positioned outside the radial confines of the tub and having an outer periphery that rotates above the lower confines of the tub;

(d) means for spinning the flywheel to a desired speed; and (e) control means for adjusting the connection between the spinning means and the flywheel.

2. Apparatus as defined in claim 1, wherein the spinning means comprises a powered wheel in frictional driving engagement with the flywheel.

3. Apparatus as defined in claim 2, wherein the control means comprises a linear actuator and is used to increase and decrease the frictional engagement between the powered wheel and the flywheel.

4. Apparatus as defined in claim 3, wherein the powered wheel is mounted on a pivot arm that is pivoted by a linear actuator controlled by the control means.

5. Apparatus as defined in claim 1, further comprising an engine and an engine clutch for rotating the drive shaft, wherein the spinning means spins the flywheel to a desired speed before engine clutch is engaged.

* * * * *